United States Patent [19]
Wilson

[11] 3,933,642
[45] Jan. 20, 1976

[54] FLOCCULATION APPARATUS
[76] Inventor: George E. Wilson, 1231 McClaren Drive, Carmichael, Calif. 95608
[22] Filed: Mar. 18, 1974
[21] Appl. No.: 451,862

[52] U.S. Cl. ............................... 210/206; 210/220
[51] Int. Cl.² .......................................... C02B 1/20
[58] Field of Search ............................. 210/42–58, 210/198 R, 199, 205, 206, 220, 221, 538, 540

[56] References Cited
UNITED STATES PATENTS

| | | | |
|---|---|---|---|
| 982,704 | 1/1911 | Bull | 210/47 |
| 1,362,611 | 12/1920 | Ellms | 210/49 |
| 1,605,596 | 11/1926 | Langelier | 210/49 |
| 2,190,596 | 2/1940 | Dorr | 210/49 |
| 2,413,375 | 12/1946 | Pomeroy | 210/49 X |
| 3,716,485 | 2/1973 | Robertson | 210/50 |
| 3,740,363 | 6/1973 | Fuller | 210/45 X |
| 3,774,768 | 11/1973 | Turner | 210/199 |
| 3,789,989 | 2/1974 | Carson | 210/199 |

OTHER PUBLICATIONS
Perry's Chemical Engineer's Handbook, 4th Edition, 1963, McGraw-Hill, pages 5-30 to 5-33.

Primary Examiner—Charles N. Hart
Assistant Examiner—Robert H. Spitzer
Attorney, Agent, or Firm—Lothrop & West

[57] ABSTRACT

Flocculation is carried out by mixing a coagulant, such as alum, with the fluid to be treated, such as water, and introducing the resultant mixture into the upstream end of a conductor. In a preferred form, the conductor comprises a series of discrete pipe sections, each downstream section having a progressively larger diameter and length with diverging transition members connecting adjacent sections. The sizes of the sections and the transition members are carefully predetermined, as is the radius of curvature of the coil, in the event the pipe is wound, so as to afford a velocity gradient and flow condition throughout the length of the pipe yielding optimum results.

Modified forms of continuous decayed velocity gradient systems are also disclosed. One form uses a coiled pipe wherein the pipe diameter is constant and the coil radius of curvature progressively increases. Another form utilizes staged compartments, each upstream compartment feeding each adjacent downstream compartment across progressively decreasing differential heads.

2 Claims, 6 Drawing Figures

FLOCCULATION APPARATUS

BACKGROUND OF THE INVENTION

Flocculation is a process utilized in water and wastewater treatment, as well as the chemical process industry, to form aggregates of particles by effecting contact between the particles by means of velocity gradients established in the fluid to be treated. These velocity gradients can be brought about either mechanically or hydraulically.

Mechanical flocculation is widely known and practiced. A stirring paddle in a large tank filled with liquid to be flocculated is moved through the liquid at a very slow speed, in the neighborhood of one to three feet per second, thereby setting up velocity gradients in the liquid and bringing about collisions of particles, one with another, so as to effect aggregation of the particles. Paddle speed is held at a value which assures minimal turbulence levels so that excessive breakup of the particle aggregates does not occur. Overall detention time in a staged mechanical flocculation system in a typical water treatment plant generally ranges from thirty to sixty minutes.

Hydraulic flocculation has generally been restricted to water treatment plants, not being widely practiced either in chemical processing or in waste water treatment. Various baffle arrangements provide a labyrinthine path for the flow of the water being treated, the induced velocity gradients causing particle collision and resultant aggregation. Overall hydraulic head losses in such installations are preferably limited to less than one foot of liquid so as to minimize the breakup of particle aggregation. Residence, or dwell, time is correspondingly lengthy.

For additional background information, reference is had to applicant's Dissertation entitled INITIAL MIXING AND TURBULENT FLOCCULATION submitted in partial satisfaction of the requirements for the degree of Doctor of Philosophy in Engineering in the Graduate Division of The University of California, Berkeley, California.

SUMMARY OF THE INVENTION

The invention relates to a flocculation apparatus which can conveniently be used either in new construction or integrated in an existing fluid treatment installation with advantageous results.

It is an object of the invention to provide a flocculator in which the residence time is substantially less than that encountered in the mechanical and hydraulic installations heretofore known.

It is another object of the invention to provide a flocculation system which is capable of operating efficiently even in a waste water treatment plant in which there are wide variations in flow rate over a 24 - hour period.

It is a further object of the invention to provide a flocculation apparatus which is relatively compact in size and economical both with respect to initial installation costs and maintenance expense.

It is yet a further object of the invention to provide a flocculation apparatus and process which is versatile in that the system readily lends itself to use in a number of different environments.

It is still another object of the invention to provide a flocculation system which provides a continuous decayed hydraulic gradient capable of yielding a narrow size distribution of a large average particle aggregate size in a minimum time.

It is an additional object of the invention to provide a generally improved flocculation apparatus.

Other objects, together with the foregoing, are attained in the embodiment described in the following description and illustrated in the accompanying drawings in which.

While the flocculation apparatus of the invention can be embodied and practiced in a variety of ways, depending upon the environment and requirements of use, a preferred embodiment is shown most clearly in FIGS. 1–3, and described in the following description.

Figure 1:
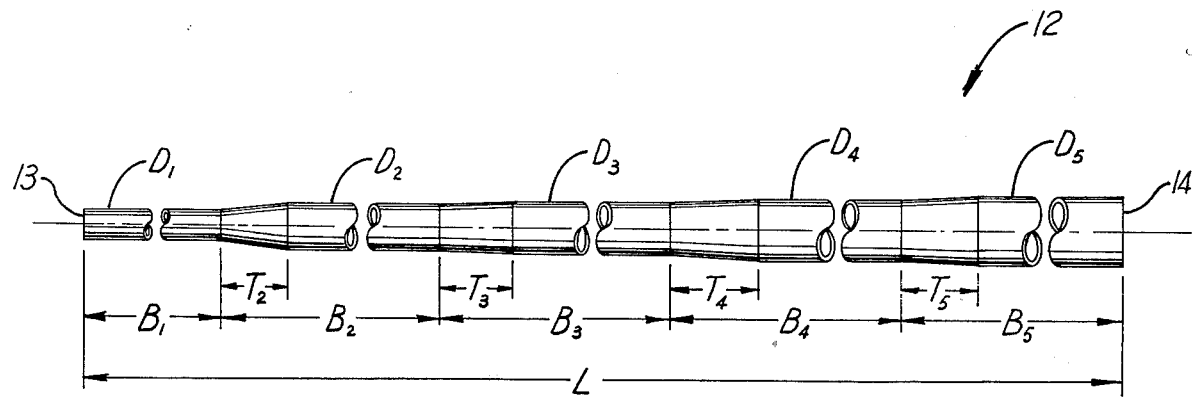
FIG. 1 is a developed view of a flocculator pipe constructed pursuant to the invention, portions of the pipe being broken away to reduce the extent of the figure.

Since a pipe flow type of installation affords several advantages over the basin arrangements heretofore widely used, there is provided, as appears in FIG. 1, in developed form, a pipe generally designated by the reference numeral 12, extending from an upstream end 13 to a downstream end 14 with an over-all length L.

Assuming that the flocculation system is to be utilized in connection with the treatment of a liquid, such as water, and, more particularly, the reduction of turbidity caused by extremely small particles of clay, or other colloidal material, suspended therein, the liquid to be treated is first mixed with a predetermined quantity of coagulant such as alum. This preliminary treatment forms no part of the present invention, has long been known and used, and is therefore not described in detail.

The coagulated liquid is introduced into the pipe inlet at the upstream end 13 and flows downstream, emerging in due course from the outlet end 14 from which location the liquid and the accompanying large particle aggregations are conducted to a separating station, as will subsequently be described.

In traveling through the pipe 12, the fluid has induced in it a myriad of velocity gradients effective to cause collisions between the colloidal particles and thereby creat particle aggregations of substantial magnitude.

A careful balance must be maintained as the liquid progresses from the inlet end toward the outlet end. That is to say, it is desirable to maintain a maximum velocity gradient in order to yield a particular particle aggregation size, and distribution, in minimum time, but without breakup of formed particles. This optimum velocity gradient is termed the maximum sub-breakable velocity gradient.

In order to maintain this desirable balanced condition, the extremely high velocity gradient at the inlet part 13 must be continuously reduced to lower relative velocity gradients. An effective way to achieve this result is to diverge the pipe in a downstream direction.

Although a smoothly continuous divergent pipe construction would provide good results, practical considerations point to a series of discrete pipe sections each of predetermined increasing diameter and length joined by diverging transition members also of predetermined size.

Thus, as appears most clearly in FIG. 1, the first section B1 having diameter D1 is connected to transition member T2 which merges into a section of larger diameter D2, followed by transition member T3 connected to the next section of still larger diameter D3, then by transition member T4 and the next section of yet larger diameter D4 succeeded by transition member T5 and the last section of largest diameter D5.

For convenience, a transition member T and the immediately succeeding pipe section is designated by the reference letter B. Thus, as shown in FIG. 1, the first pipe section is B1 (there being no transition member T in this first section; B2 consists of transition member T2 and the succeeding pipe section; B3 consists of transition member T3 and the succeeding pipe section, etc.

It is again emphasized that in order to maintain the desired balance in the flow conditions, the pipe dimensions must carefully be predetermined.

For straight pipe Decayed Gradient Flocculation, the optimum pipe diameter, D, is related to travel distance, x, as follows:

$$D^5 = \frac{20\,Bf}{7} \cdot \frac{4Q}{\pi}^2 \cdot x$$

where,
$D$ = pipe internal diameter (cm)
$f$ = pipe Darcy friction factor (1)
$Q$ = flow rate (cm$^3$/sec)
$x$ = fluid travel distance (cm)
$B$ = floc particle breakup rate coefficient (sec$^2$/cm$^2$)
 = $k_2/e_T$
where,
$k_2$ = floc breakup rate constant (sec$^{-1}$) ascertained by the procedure described in Wilson, "Initial Mixing and Turbulent Flocculation", Ph.D. Thesis, University of California, Berkeley, California, 1972
$e_T$ = total specific energy dissipation rate (cm$^2$/sec$^3$)

For coiled pipe Decayed Gradient Flocculation, wherein the coil has a radius of r, measured to the center of the coiled pipe of diameter $D_c$, the Darcy friction factor, $f_c$, will be larger than the straight pipe fraction factor, $f$, specified above. To achieve a given degree of flocculation in a minimum of time, the coiled pipe diameter, $D_c$, will be related to the straight pipe diameter, D, above, as follows:

$$\frac{D_c}{D} = \frac{F_c}{f}^{1/7}$$

and the length of coiled pipe, $x_c$, will be related to the length of straight pipe, x, above, as follows:

$$\frac{x_c}{x} = \frac{f}{f_c}^{2/7}$$

The critical Reynolds number for turbulence in coiled pipe flow is reported as follows in Perry's Chemical Engineers Handbook, 4th Edition, $$N_{Re\ critical} = 2 \times 10^4 \; \frac{D_c}{2r}^{0.32}$$

Based upon the foregoing, installation dimensions can be ascertained for any desired capacity.

Thus, for a relatively small installation, termed Model 150 (capable of treating 150 gallons per minute), in which the over-all pipe length L is 450 feet, the first section B1 is 5 feet in length and has a diameter D1 of 2.0 inches; the second section B2 is also 5 feet in length including transition member T2, which is nominally equal to 6 inches, and D2 is 3 inches; T3 is nominally 7 inches, B3 is 10 feet and D3 is 4 inches; T4 is nominally 9 inches, B4 is 95 feet and D4 is 6 inches; lastly, T5 is nominally 11 inches, B5 is 335 feet and D5 is 8 inches.

For a somewhat larger installation, termed Model 400 (capable of treating 400 gallons per minute), the over-all pipe length L is 562 feet and the respective dimensions are as follows: B1, 6.5 feet, D1 2.5 inches; T2, about 24 inches, B2, 16.5 feet, D2, 6 inches; T3, about 11 inches, B3, 53 feet, D3, 8 inches; T4 about 12 inches, B4, 106 feet, D4, 10 inches; and, T5, about 14 inches, B5, 308 feet, D5, 12 inches.

In addition to maintaining the maximum sub-breakable velocity gradient, it is also necessary to maintain a nearly laminar flow condition throughout the pipe length in order to minimize the potential for particle aggregate breakup resulting from turbulent velocity fluctuations. In other words, random swings from steady state flow conditions could be of such magnitude as to cause undesirable particle disruptions and consequent degradation of the aggregate buildup pattern.

Accordingly, I have subjected the continuous pipe flow arrangement heretofore described to the influence of centrifugal forces, such forces being capable of stabilizing flow conditions and maintaining laminar flow conditions even at relatively high Reynolds numbers.

These stabilizing forces are introduced by coiling the pipe into a spiral, or helix, bearing in mind that the critical Reynolds number is a function both of pipe diameter and coil diameter. Pipe diameter, in other words, is a parameter affecting not only the establishment of the maximum sub-breakable velocity gradient, along with pipe section length, but must also be considered in conjunction with coil diameter to maintain laminar flow conditions.

It is also to be noted that by superimposing these centrifugal forces on the customary pipe wall forces found in linear flow, much greater head loss per unit volume of liquid is encountered; i.e. the equivalent "hydraulic length" of a coiled pipe may be much greater than that found in linear flow. Here again, the amount depends upon the ratio of pipe to coil diameter.

Thus, by adjusting the various dimensions of the system components, the desired flow properties and attendant beneficial flocculation results can most advantageously be achieved.

Figure 2:
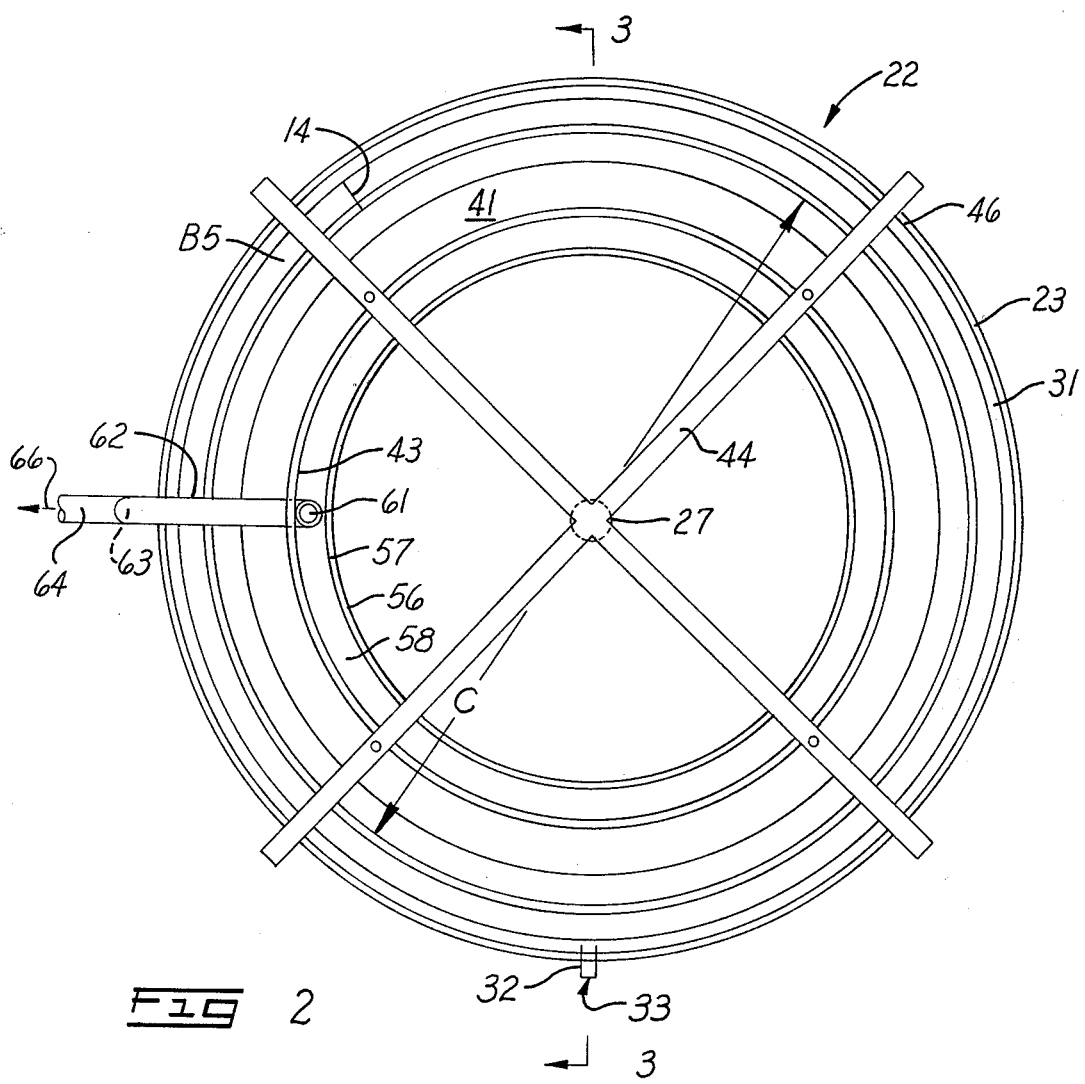
FIG. 2 is a top plan view of the straight pipe flocculation apparatus of FIG. 1 wound in a coil and installed in a typical installation.
Figure 3:
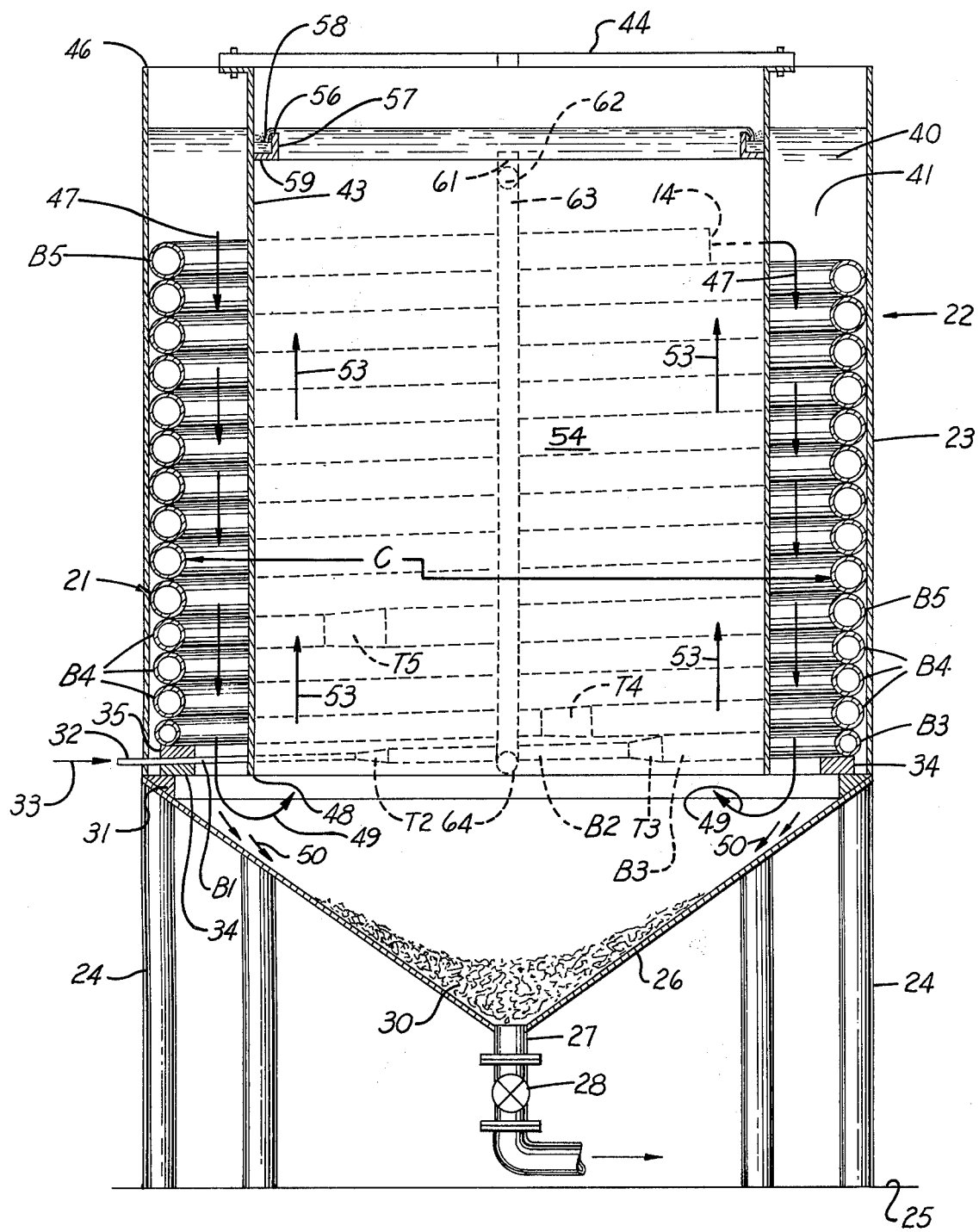
FIG. 3 is a median vertical sectional view of the installation shown in FIG. 2, the plane of the section being indicated by the line 3 — 3 in FIG. 2.

An installation incorporating the foregoing principles so as to maintain the maximum sub-breakable velocity gradient throughout the length of the pipe and under laminar flow conditions is most clearly shown in FIGS. 2 and 3.

In FIGS. 2 and 3, the pipe illustrated in linear, or developed, form in FIG. 1 is curved into a coil 21 having an internal diameter C which in the case of the Models 150 and 400 is 10 feet and 16 feet, respectively.

The coiled pipe 21 is disposed within a holding tank 22, having an upper portion 23 which is preferably cylindrical in shape and supported on a plurality of columns 24 extending upwardly from ground level 25. The lower end of the cylindrical tank is closed by an inverted conical bottom 26 terminating at the apex in a drain 27 controlled by a valve 28 to be used periodically when the relatively heavy particle aggregations 30 which have accumulated at the bottom of the tank are to be removed.

An annular ledge 31 around the bottom of the cylindrical tank serves to support the pipe coil 21 as shown, with the upstream end 13 of the pipe coil at the bottom so as to receive liquid from the adjacent inlet nipple 32 in the direction indicated by the arrow 33. Suitable support blocks 34 and spacers 35 transfer the weight of the pipe coil to the annular ledge 31.

As the liquid from the inlet nipple 32 passes through the initial curved pipe section B1, then enters the divergent portion T2 and into the expanded chamber created by the larger diameter of the section B2, the relatively high initial velocity gradients begin to decay, this process continuing as the flow proceeds onwardly through successively more capacious conduits. At the same time aided by centrifugal force and the additional "hydraulic length" afforded by the coiled pipe configuration, nearly laminar flow is maintained. Optimum conditions are thereby created for the aggregation of the floc bodies, with the result that as the liquid emerges from the outlet end 14 of the pipe, a very large number of particle aggregates of a desirable size range is present, and substantially all the suspended particles have been captured.

Upon emerging from the outlet end 14 of the pipe section B5, the liquid and entrained floc aggregates enter the body of liquid 40 in the annular space 41 between the cylindrical tank 23 and a cylindrical divider wall 43, or baffle, which is coextensive in height with the cylindrical tank 23. The divider wall 43 is suitably attached to and depends from a horizontal X-shaped framework 44 supported on the upper rim 46 of the tank 23.

The body of liquid 40 in the annular passageway 41 is substantially greater in extent than the stream emerging from the pipe outlet 14 and serves still further to reduce any residual velocity gradients. Thus, the relatively large and heavy aggregate particles begin to descend in the direction indicated by the arrows 47 in FIG. 3. At the same time the liquid itself flows slowly downwardly in the same direction 47.

Upon reaching the lower end 48 of the divider wall, the liquid flows inwardly and upwardly as indicated by the arrows 49 whereas the relatively heavy floc groupings continue to descend, by inertia, toward the inverted conical bottom 26 as shown by the arrows 50, and are deflected laterally and downwardly by the conical walls to collect in the bottom of the cone from which location the accumulation is drained, or flushed, at suitable intervals.

The clear fluid, devoid of aggregate particles, continues to ascend, as indicated by the arrows 53, through the body of fluid in the large central chamber 54 defined by the divider walls 43. Upon reaching the top 56, or lip, of the ring 57 spaced inwardly from the cylindrical divider wall 43, the clear fluid spills over the lip 56 into the annular trough 58 defined by the ring 57, the encompassing wall 43 and the annular bottom 59, the bottom 59 being suitably mounted on the divider wall 43, as by welding.

Entry of the fluid into the very large body of fluid in the chamber 54 marks the last and largest cross-sectional areal expansion of the conductor carrying the fluid, beginning with the relatively small pipe section B1. The specific energy and velocity gradients have correspondingly been substantially dissipated at the optimum rate.

After rising through the large body of fluid in the central chamber 54 and spilling over the weir-like lip 56 into the annular trough 58, the clear fluid descends through an opening 61 in the trough 58 thence through a radial pipe 62 extending through the wall 23 of the cylindrical tank 22, down a downspout 63 and into a pipe 64. From the pipe 64 the clear fluid is conducted away in the direction of the arrow 66 to storage and ultimate distribution, as desired.

Figure 4:
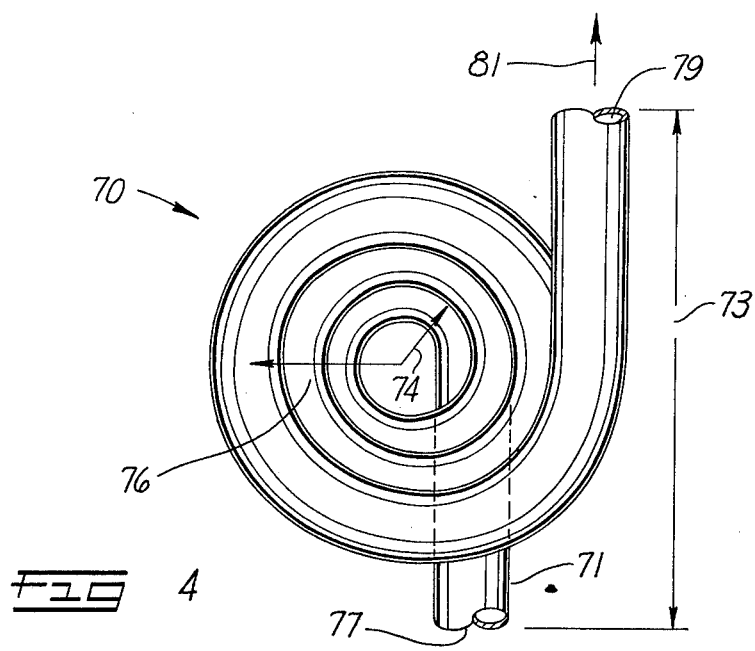
FIG. 4 is a top plan view of a modified form of apparatus.
Figure 5:
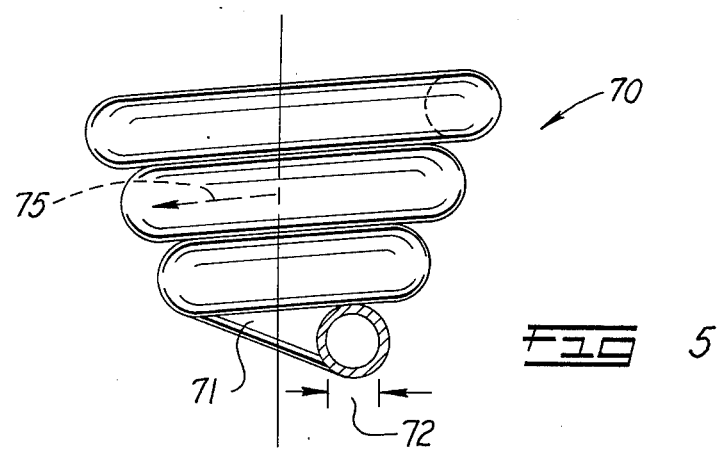
FIG. 5 is a front elevational view of the FIG. 4 form of apparatus.

A variant form 70 of the flocculator is disclosed in FIGS. 4 and 5. In this modification, a pipe 71 is again used, but in this instance the pipe is of uniform diameter and the desired nearly laminar flow conditions and maximum sub-breakable velocity gradients are controlled by appropriately adjusting pipe diameter 72, pipe length 73 and continuously varying the radii of curvature 74, 75, 76, etc. It will be noted, for example, that the initial radius of curvature 74, near the inlet 77, is relatively "tight", thereby affording a substantial "hydraulic length" so as to effect prompt decay or degradation of the velocity gradients existing at the inlet 77 and, at the same time, maintaining control over flow conditions owing to the considerable centrifugal force imposed upon the stream flow by tightly winding the coil.

As the liquid proceeds on its way, continuous decay of the velocity gradients occurs so that when the liquid and the attendant floc congregations emerge from the outlet end 79 in the direction of the arrow 81, the extent of the velocity gradients is minimal and separation by any suitable, conventional system is readily taken care of.

Figure 6:
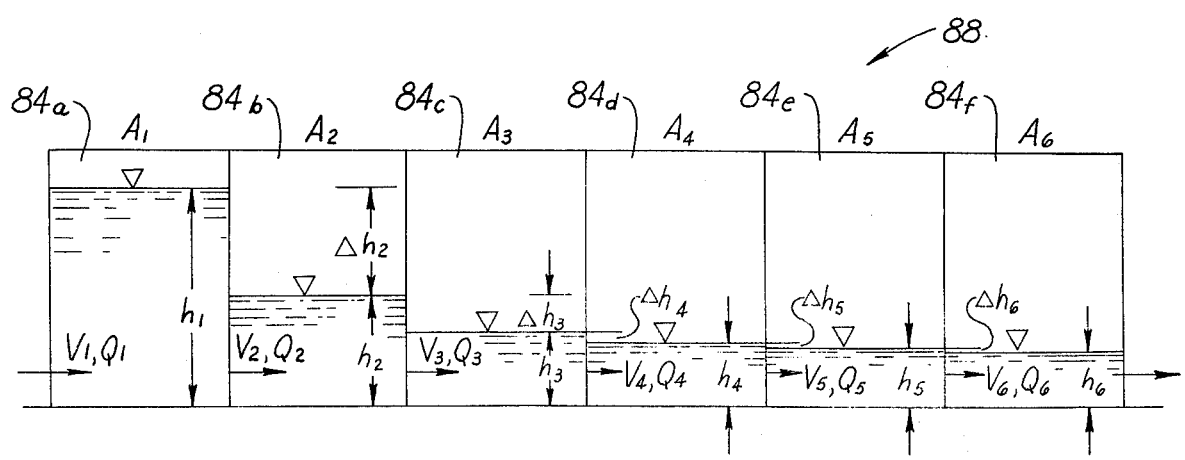
FIG. 6 is a diagrammatic view of another form of flocculator.

FIG. 6 shows another modified form of flocculator involving a plurality of staged compartments 84a – 84f at progressively lower "heads" corresponding to the progressively reduced velocity gradients of the previously described flocculation systems.

In the FIG. 6 form of device, the liquid to be treated, descends in steps, or stages. As before, the energy dissipation rate is carefully predetermined so as to achieve optimum flocculation with a minimum of time and a minimum of aggregate particle breakup. Thus, the first compartment 84a, or stage, of the flocculation reactor, or system, generally designated by the reference numeral 88, is filled with liquid to a height h1, descending to a height $h2$ in the second compartment 84b, through a differential head $\Delta h2$, then to height $h3$ in the third compartment 84c, through a differential head $\Delta h3$, etc.

It will be noted that the differential head drop is exponential in nature, with the differential head drop $\Delta h6$ closely approaching an insignificant amount.

With Ai the surface area of the ith compartment; Vi, the entrance velocity to the ith compartment; Qi, the amount of flow to the ith compartment; hi, the liquid height in the ith compartment; the maximum specific energy dissipation rate to the ith compartment, $e_i$, is given by the formula:

$$ei = \frac{Qi\rho g\,(Vi^2/2g)}{Ai hi \rho} = \frac{Vi^2}{2(Ai hi/Qi)} = \frac{Vi^2}{2Ti}$$

where
$\rho$ = density (gm/cm$^3$)
and
$Ti$ = Average residence time in ith compartment (sec)

For a submerged orifice
$Vi^2/2 = g[h(i-1)-hi] = g\Delta hi$
Therefore $$ei = \frac{g\Delta hi}{Ti}$$

Further, compartment residence times are related to the maximum sub-breakable energy dissipation rate, $e_i$, as follows:

$$ei = \frac{1}{2Bti}$$

where,
$e_i$ = specific energy dissipation rate in the ith compartment (cm$^2$/sec$^3$)
$B$ = breakup rate coefficient (sec$^2$/cm$^2$) (see above); and,
$ti = T1 = T2 + \ldots Ti$ (sec)

Thus, by selecting suitable values so that the Decayed Gradient Flocculation equations are satisfied, systems having specific dimensions and configurations can be arrived at.

What is claimed is:

1. A flocculation apparatus for the treatment of a fluid, said apparatus comprising:
  a. a conductor capable of carrying the fluid and a coagulant mixed therewith from an upstream inlet end at a first relatively high pressure head to a downstream outlet end at a second relatively low pressure head, the dimensions and configuration of said conductor being predetermined so that the rate of energy dissipation at any location throughout said conductor is such as to effect flocculation of particle aggregates to any given size in the minimum time;
    1. said conductor being a pipe including a plurality of discrete sections, each section having a predetermined diameter and length, and a plurality of transition members of predetermined length connecting adjacent pipe sections, said discrete sections being of progressively larger diameters in a downstream direction;
    2. said pipe being helically wound into a coil of predetermined diameter;
  b. a vertical, right circular cylindrical tank encompassing said coil;
  c. an inverted conical closure depending from the lower end of said tank and forming the bottom of said tank;
  d. a vertical, right circular cylindrical divider wall defining an interior compartment, said divider wall being coaxially disposed within said tank and forming an annular vertical passageway with the walls of said tank;
    1. said pipe coil being supported on said tank and located within said annular passageway with the outlet end of said pipe discharging into said annular passageway, the bottom end of said annular passageway overlying said inverted conical bottom of said tank so that the heavier flocculation clusters in the treated fluid descend through said annular passageway into contact with said inverted conical bottom and are downwardly and inwardly deflected thereby toward the apex of said inverted conical bottom; and
  e. means for periodically draining the accumulated flocculation clusters from the apex area of said inverted conical bottom of said tank.

2. A flocculation apparatus as in claim 1 further including an annular trough mounted on the inner surface of said cylindrical divider wall, said trough including a weir-like lip over which the fluid at the upper exposed surface of the water body within the divider wall interior compartment spills into the trough; an outlet opening in said trough; and means for conducting the fluid away from said opening.

* * * * *